Figure 1:
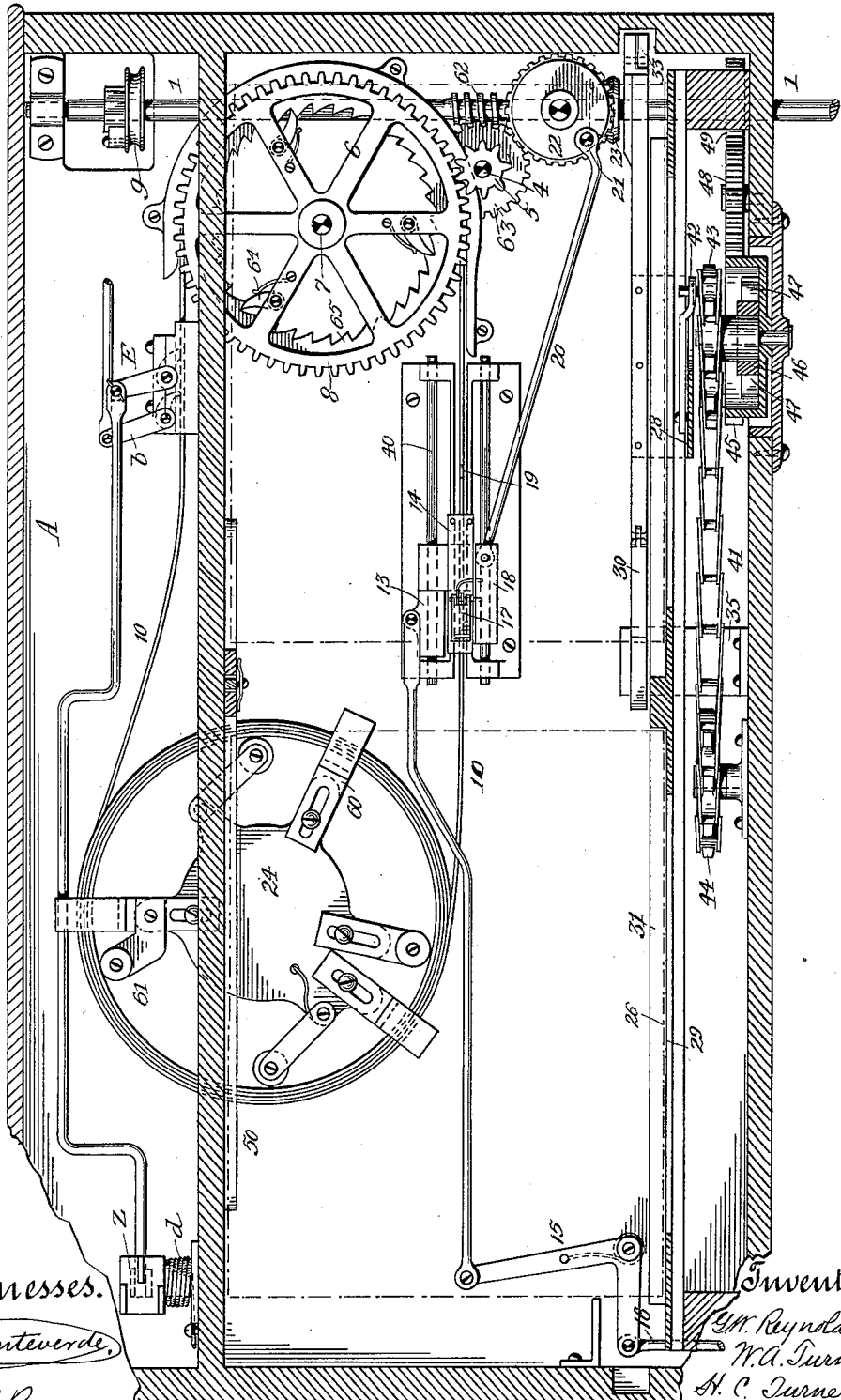

No. 611,940. Patented Oct. 4, 1898.
G. W. REYNOLDS & H. C. & W. A. TURNER.
STATION INDICATOR AND ADVERTISING DEVICE.

(Application filed Jan. 2, 1894. Renewed Feb. 5, 1898.)

(No Model.) 3 Sheets—Sheet 1.

No. 611,940. Patented Oct. 4, 1898.
G. W. REYNOLDS & H. C. & W. A. TURNER.
STATION INDICATOR AND ADVERTISING DEVICE.
(Application filed Jan. 2, 1894. Renewed Feb. 5, 1898.)
(No Model.) 3 Sheets—Sheet 2.

Witnesses.
Inventors

No. 611,940. Patented Oct. 4, 1898.
G. W. REYNOLDS & H. C. & W. A. TURNER.
STATION INDICATOR AND ADVERTISING DEVICE.
(Application filed Jan. 2, 1894. Renewed Feb. 5, 1898.)
(No Model.) 3 Sheets—Sheet 3.
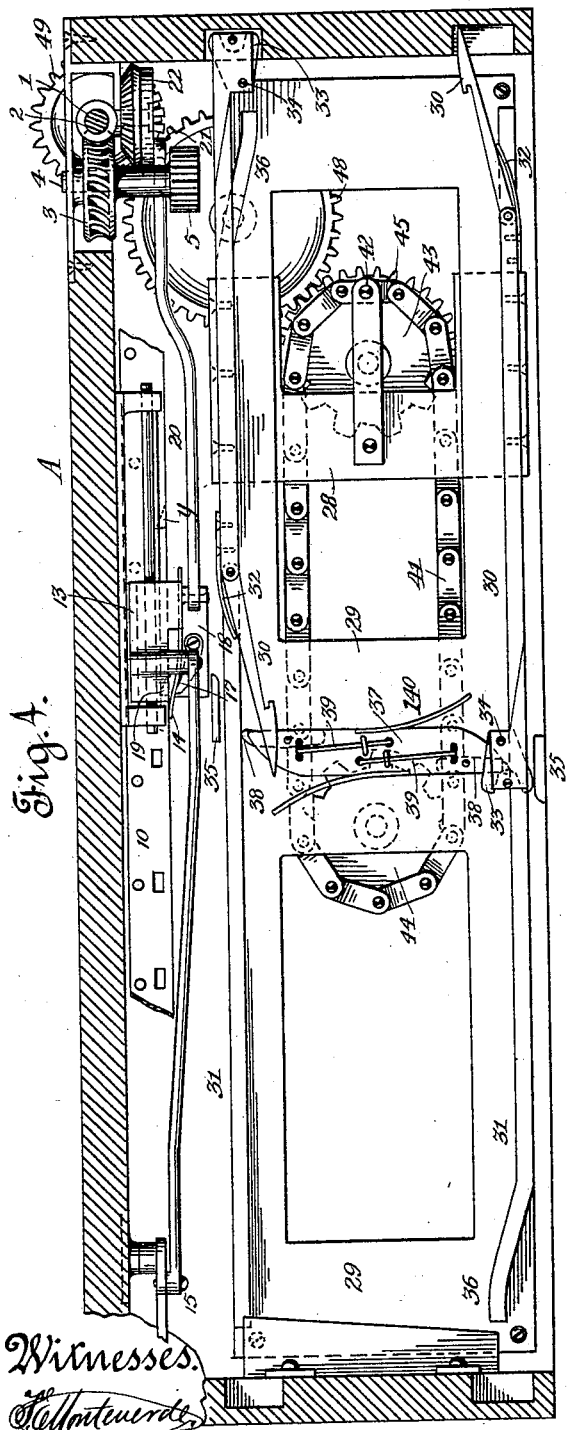
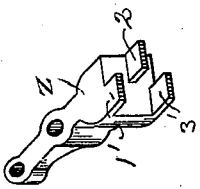
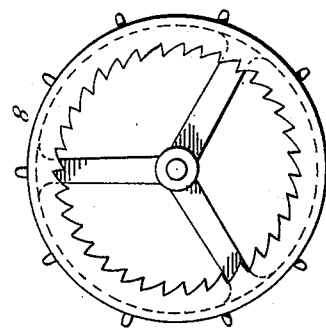
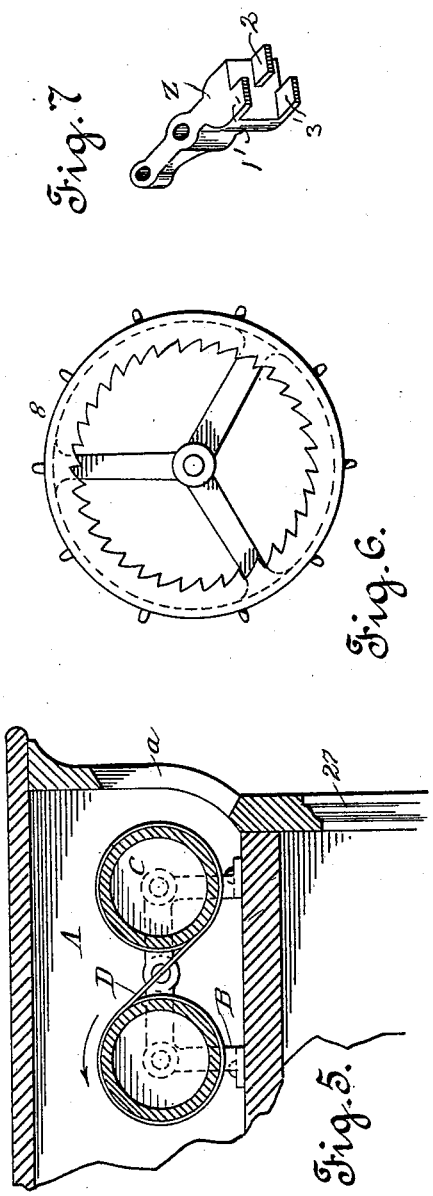
Witnesses.
Inventors
George W. Reynolds
William A. Turner
Herbert C. Turner
by Spear & Seely Atty's

United States Patent Office.

GEORGE W. REYNOLDS AND HERBERT C. TURNER, OF SAN FRANCISCO, AND WILLIAM A. TURNER, OF GILROY, CALIFORNIA, ASSIGNORS TO THE AMERICAN INDICATOR COMPANY, OF SAN FRANCISCO, CALIFORNIA.

STATION-INDICATOR AND ADVERTISING DEVICE.

SPECIFICATION forming part of Letters Patent No. 611,940, dated October 4, 1898.

Application filed January 2, 1894. Renewed February 5, 1898. Serial No. 669,278. (No model.)

*To all whom it may concern:*

Be it known that we, GEORGE W. REYNOLDS and HERBERT C. TURNER, residing in the city and county of San Francisco, and WILLIAM A. TURNER, residing at Gilroy, in the county of Santa Clara, State of California, citizens of the United States, have invented certain new and useful Improvements in Station-Indicators and Advertising Devices; and we do hereby declare that the following is a full, clear, and exact description thereof.

Our invention relates to apparatus for indicating streets or stations in railway-cars; and its object is to produce an indicator which shall be more useful as an advertising device than those heretofore constructed, where the indicating and advertising are performed by a single mechanism, and the street-names and advertising-cards are shown together on a single surface.

In the present invention we introduce a new and novel feature—namely, the combination with a street-indicator of an advertising device which receives motive power from the same source as the street-indicator and is contained in the same case, but which is operated independently of the street-indicator and is thus enabled to exhibit more than one new advertisement to each block of roadway, thus greatly enlarging the capacity and enhancing the value of the advertising device. In all other indicators hitherto used a new advertisement is displayed only when the street-naming device is actuated. In this indicator we display two or more different advertisements to each block of average length, thus giving the advertiser the advantage of having his card shown oftener, while it also remains in sight long enough for its contents to be read. The advertising-cards occupy a space in front of the street-indicating mechanism and below the street-naming curtain or belt, and the advertisements are displayed through a sight-opening independently of the names of streets or stations.

Figure 2:
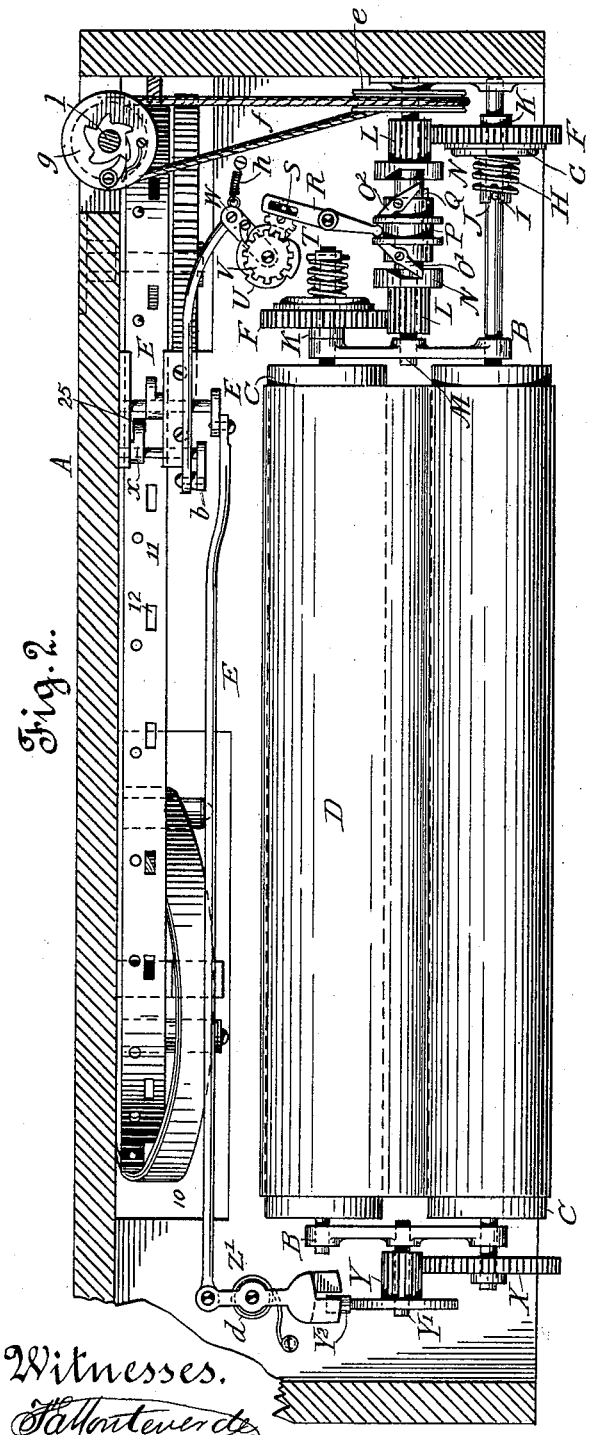
Figure 3:
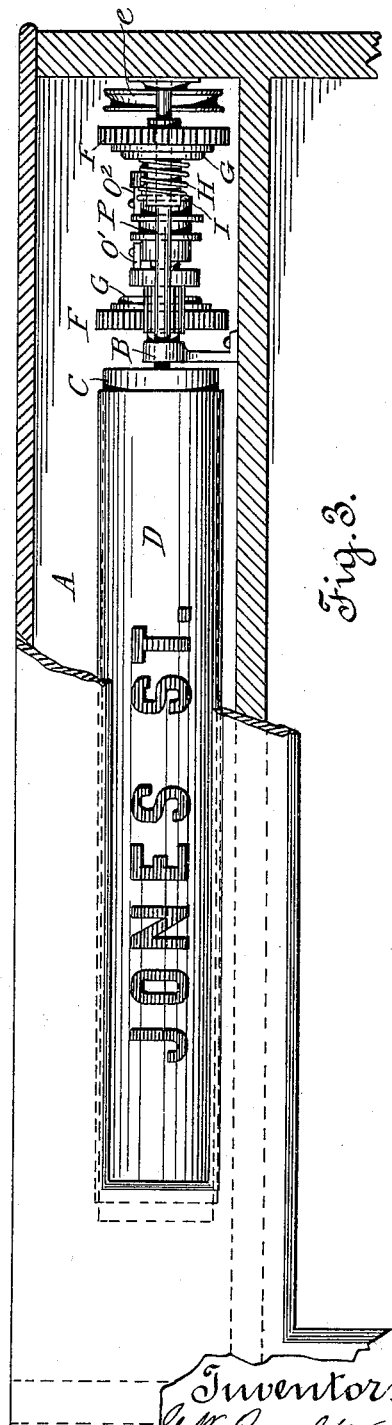

In the accompanying drawings, Figure 1 is a vertical longitudinal section through the inclosing case or box, showing all the mechanism for indicating and advertising excepting the indicating belt and rollers and the gearing for driving the latter. Fig. 2 is a horizontal section of the box, showing the indicating mechanism in plan view. Fig. 3 is a front view of the indicating roller and belt looking through the sight-opening in the box. Fig. 4 is a top plan of the mechanism for moving and transferring the advertising-cards. Fig. 5 is a cross-section of the indicating-rollers. Fig. 6 is a detail view of the combined sprocket and ratchet wheel which drives the controlling-ribbon of the indicating mechanism. Fig. 7 is a separate view of the latch operated by the controlling-ribbon and which alternately holds and releases the indicating-rollers.

The particular construction of the indicating mechanism forms no part of the invention in this case, as it is described, shown, and claimed in an application of even date herewith by Herbert C. Turner, one of the present applicants, numbered 495,349; but as it is the construction we prefer to use it is fully shown in the drawings and will be hereinafter described, in order that its relations to the box or case which contains the whole mechanism and to the advertising mechanism may be clearly understood.

In the drawings similar letters and numerals of reference indicate corresponding parts in all the figures.

The letter A indicates a box or case, of wood or other suitable material, in which are secured standards B, Fig. 3, forming bearings for the shafts of two rollers C, carrying the curtain D. The face of this curtain is marked with the names of the streets, stations, or other places to be indicated, and the case A is provided with a sight-opening $a$, Fig. 5, through which said names are exposed to view in succession as the curtain is wound on and off either of the rollers.

For the purpose of producing the required motions of the curtain-roller C each of the roller-shafts is provided with a loose cog-wheel F and a sliding friction-disk G, which is pressed against F by the spring H and is prevented from revolving on the roller-shaft by the pin I, which passes through the roller-shaft and engages with a slot J in the end of the sleeve of the friction-disk G. The loose cog-wheels are prevented from moving away from the friction-disks by the fixed collars K.

The loose cog-wheels F gear with and receive motion from the small loose pinions L, which are loosely journaled on the shaft M and bear on their inside faces disks N, which are provided with notches to engage with corresponding pawls O' O², fulcrumed on the shifting slide P.

The shifting slide P is loose on the shaft M, so that it may be moved to and fro to allow of the engagement with the small pinions of either of the pawls O' O², and is made to revolve with the shaft M by a keyway on its inner surface which engages with the key Q on the enlarged portion of the shaft M.

The shifting slide P is moved into and out of connection with either of the disks N by the lever R, one end of which engages with the groove in P, the other end being slotted to permit of the movement of the crank-pin S on the small pinion T. The pinion T is revolved one-half round at each quarter-revolution of the four-toothed ratchet U, to which is fastened the cog-wheel V, gearing with pinion T.

The ratchet-disk U is moved by the swinging arm W, on which is a spring-actuated pawl to engage with the ratchet-disk U, the arm W being connected to the bell-crank reversing-lever $b$. When the horizontal arm $x$ of this lever falls through a slot 25, Fig. 1, in the street-actuating ribbon, through the tension of the spring $h$, the pawl on the arm W engages with the ratchet-disk U and as the movement of the street-actuating ribbon raises the lever out of the slot rotates the disk, thereby revolving the pinion T one half-revolution and shifting one of the pawls O' O² out of connection and the other into connection with its corresponding disk N, and thus reverses the direction of the winding of the curtain D. Two rectangular shifting holes 25 are punched in the street-actuating ribbon, one corresponding with either end of the road.

On the left end of the front roller C is fastened a cog-wheel X, which gears with the loose pinion Y, loosely journaled on a stud Y', fastened in the bearing B. Fastened to the outer end of the pinion Y is a disk bearing on its periphery a point Y², which engages with and is released by the swinging latch Z. The latch Z has three lips that engage with and control movement of point Y² and are designated by the numerals 1', 2', and 3'. (See Fig. 7.) The latch Z is fulcrumed at Z' and, through the movement given it by the spring $d$ when the bell-crank lever E enters a street-indicating hole in the actuating-ribbon, releases the pinion Y, which is revolved one revolution by the loose cog-wheel F and friction-disk G. The point Y² then comes against the upper side of the latch-lip 1', Fig. 7, and as the bell-crank lever E rises out of the hole in the street-ribbon the lip 1' swings away from under the point Y², and it then bears against the upper side of lip 2', which prevents further movement of the street-curtain D until the next street-hole passes under the lever E. Lip 3' on latch Z takes the place of lip 2' when the movement of the curtain is reversed on the return trip of the car.

The relation of the gears X and Y are as 1 to 3, so one revolution of the pinion Y allows the roller C to be revolved one-third of its circumference, which is the necessary distance to bring into view a street-name.

Fastened to the right end of the shaft M is a pulley $e$, which through its connection by a cross-belt $f$ with the pulley $g$ on the actuating-shaft 1 gives rotary motion to the shaft M.

We will now describe the device that actuates the movement of the street-curtain D at the proper time and place as the car passes over the route.

1 is the actuating-rod or driving-shaft, which receives rotary motion from the car-axle through suitable mechanism under the car-body.

62 is a worm fastened to the actuating-rod, which engages with the worm-gear 63, which is loosely journaled on the stud 4 and bears on the outer end of its hub the small pinion 5.

On the upper end of the actuating-rod 1 is the pulley $g$, which gives motion to the shaft M through a cross-belt $f$.

The pinion 5 gears with and gives motion to the gear 6, which is loosely journaled on a pin 7 and bears on some of its spokes spring-actuated pawls 64, that engage with the internal ratchet 65 on the front face of the sprocket-wheel 8, which also revolves loosely on 7.

The sprocket-wheel 8 engages with and gives a very slow motion to an endless steel ribbon 10, which has equally-spaced holes 11, (near one of its edges,) which engage with the sprocket-wheel 8. It also contains the two rectangular holes 25, before mentioned, which engage with the bell-crank $b$, so placed as to shift the direction of movement of the curtain or belt at either terminus of a route.

Near the opposite edges of the ribbon are punched rectangular holes 12 to engage with the bell-crank lever E. They are so spaced as to correspond with the distances between the streets, stations, or other points to be indicated.

As the ribbon 10 runs in the same direction all the time, it is necessary that it contain a number of street-holes equal to the number of streets to be indicated on the full round trip of the car.

After leaving the sprocket-wheel the ribbon passes to the connecting mechanism, (shown in Fig. 1,) of which 13 is a slide guided by a rod 40 and having on its outer face a flat spring 14, which bears against the edge of the ribbon. The slide and spring are moved back— i. e., to the right—by the bell-crank 15 when the car rounds a curve, the swiveling movement of the truck lifting the rod 16. When the spring 14 is moved back, it allows the spring-actuated pawl 17 on another and continually-moving slide 18 to engage with a notch cut in the edge of the ribbon, which notch is cut to correspond to a curve in the roadway and will occupy a position opposite to that of the extreme movement of the pawl 17, as shown in drawing Fig. 4, if the car-axle has not lost motion. If it has lost motion, the notch will be a little to the right of that position—for instance, as shown at 19 in Fig. 1—and as the slide 13 is pushed back through the movement of the truck on the curve it will allow the pawl 17 to engage with the notch J, and at the forward movement of the slide toward the left end of the box the ribbon will be moved up to the point it should have occupied had no lost motion occurred.

The street-actuating ribbon is moved ahead by the pawls and ratchet on gear 6 and sprocket 8 and is carried ahead by the same when corrected.

The slides 13 and 18 have a movement that equals the travel of the street-actuating ribbon in two or three blocks, so is capable of taking up that amount of lost motion, which experience has shown us to be more than enough to keep the street-actuating ribbon practically correct. The slide 18 is moved by the arm 20, which is connected to the crank-pin 21 on the bevel-gear 22, which gear is geared with the actuating-rod 1 by the bevel-gear 23.

The greater part of the street-actuating ribbon is held in a coil by the guide-plate 24, which is fastened to the back of the box and provided with rollers 61 and cleats 60 to hold the ribbon in place while it runs onto and off the coil, winding on the outside of coil at bottom and running off on the inside and back of the main coil at the top of coil, as shown in Fig. 1.

The bell-crank lever E connects with the latch Z and successively enters the rectangular street-holes in the ribbon by the pressure of the spring $d$ on latch, and thereby releases the point $Y^2$, allowing the street-curtain to show the name of the next street the car will cross. The point of the lever E is then raised out of the street-hole by the forward movement of the steel ribbon and remains in position to engage with the next street-hole.

We now describe the construction and operation of the mechanism for moving and transferring the cards which bear the advertisements.

The dotted lines 26, Fig. 1, show the position of the cards or advertising-plates. These cards are placed in two packs, one in each end of box. Each pack contains about fifty cards in the average-size machine, although the machine can be built to accommodate more or less than that number. When the car is moving, the advertising-cards, operated by a slide 28 and grippers 30, Fig. 4, are constantly changing, one sliding from off the front of the right-hand pack onto and in front of the left-hand pack, and as the slide 28 moves toward the right one is taken off the back of the left-hand pack and slid back of the right-hand pack. The slide 28 then moves to the left again and one is taken from the front of the right-hand pack and moved to the left-hand pack, and so on.

The slide 28, Fig. 4, consists of a U-shaped piece of metal which is suspended loosely under the card-platform 29 by the hinged pulling hooks or grippers 30, which are fastened to the upturned edges of the slide 28 and rest and slide upon the raised ribs 31 of the platform 29.

Each of the pulling-hooks 30 is provided at one end with a spring 32, which keeps the hooks against the cards, so that they will hook over the lower edge of the card and transfer it to the other pack when the slide 28 is operated. On the other end of the pulling-hooks are the swinging pieces 33, fulcrumed to the pulling-hooks at 34 and so shaped and placed that as the slide moves to one end of the platform the swinging arm 34 will be pressed against the cards by the stationary uprights 35. Thus on the slide moving to the right the left-hand pack is moved back so that the front right-hand card may pass in front of it, and as the slide moves to the left the right-hand pack is pressed forward, allowing one card from the left pack to enter behind it.

The raised ribs 31 of the platform 29 are covered in at 36, thus holding the outer ends of the cards in the correct position to engage with the pulling-hooks.

The two packs of cards are separated by a raised partition 37 across the middle of the platform. This partition reaches nearly to the raised ribs, just enough space at either end being allowed to permit the passage of one card.

On the ends of the partition are fulcrumed swinging pieces 38, that are pressed back by the card and swing in behind it after its passage, thus preventing its slipping back. These swinging pieces 48 are provided with springs 39 to hold them in position.

Projecting into the card-chambers on either side of the partition 37 are flat springs 140, which engage with the ends of the cards and keep those near the beveled end of the partition in the correct position to pass through the space when the box is inclined in ascending or descending grades. The slide 28 is moved to and fro on the platform 29 through its connection with the chain 41 by the swinging arm 42, one end of this arm being pivoted on the slide and the other end to the chain. As the chain runs around the sprocket-wheels 43 and 44 the arm 42 pushes or pulls the slide in one or the other direction along the platform 29.

The sprocket-wheel 43 is rotated by an internally-frictional gear-wheel 45, which is shown in section in Fig. 1 and is journaled under and on the same stud as the sprocket-wheel 43. On the hub of the sprocket-wheel is fastened a disk 46, and fastened to this disk are outwardly-extending flat springs 47, which bear against the inside surface of the gear-wheel 45 and rotate the sprocket-wheel when the gear 45 is revolved. This friction is provided as a safety, so that if the cards should get bent or caught in any way the actuating-rod 1 would go on turning, and thus the card portion being out of order would not hinder the correct working of the street-indicating part of the machine.

The gear 45 receives its motion from the gear 48, which in turn receives motion from the small gear 49, fastened to the actuating-rod 1.

The under side of the upper shelf on which rests the bearings B is provided with downward-projecting edges 50, which correspond with the raised ribs 31 on the lower platform 29, thus holding the top of the cards in correct position.

The arrangement of these cards and the course of their travel is shown in an application for patent, Serial No. 344,371, filed by William A. Turner and patented October 8, 1895, No. 547,592.

Other forms of indicator and other forms of advertising device may be substituted for those here shown without substantial alteration in the invention as described, the essentials being the continuously-driven source of power, (actuated by the car-axle in this instance, but capable of being actuated by a supplemental wheel,) a direct connection between this source of power and the advertising mechanism, causing continuous motion of the advertising device, and an indirect connection between the source of power and the indicating mechanism, causing intermittent motion of the indicating device.

Having described our invention, we claim—

1. In an automatic indicator and in combination, a box or case, containing independent station-indicating mechanism, and advertising means, a positively and continuously driven rod or shaft extending into the case, a direct connection between said rod and the advertising means, whereby the latter are moved continuously, and an endless movable controller operated by the driving-rod and connected to and producing intermittent motion in the station-indicating mechanism, all constructed and arranged so that in a single case will be displayed the names of streets or stations in proper sequence at intervals, and also a continuously-moving series of advertisements.

2. In combination with a box or case, the slide 28, the movable endless chain 41, the oscillating arm 42 pivoted to both said slide and said chain, gearing from a driving-shaft for moving said chain and by an alternate push and pull causing said slide to reciprocate two series of transferable cards, and grippers attached to the slide for transferring cards successively and alternately from one series to the other, substantially as set forth.

In testimony whereof we have affixed our signatures, in presence of witnesses, this 9th day of December, 1893.

GEORGE W. REYNOLDS.
HERBERT C. TURNER.
WILLIAM A. TURNER.

Witnesses to signatures of G. W. Reynolds and H. C. Turner:
L. W. SEELY,
M. R. BRYAN.

Witnesses to signature of W. A. Turner:
GEO. E. HERSEY,
A. S. COLE.